_United States Patent Office_

3,766,297
Patented Oct. 16, 1973

3,766,297
COATING COMPOSITIONS
Thomas N. Ginsberg, Piscataway, N.J., and Edward Marvin Smolin, Easton, Pa., assignors to GAF Corporation, New York, N.Y.
No Drawing. Filed Mar. 30, 1971, Ser. No. 129,582
Int. Cl. C08f 29/20, 37/16; C08g 37/16
U.S. Cl. 260—853      8 Claims

ABSTRACT OF THE DISCLOSURE

An interpolymer between a copolymer of an alkyl vinyl ether with vinyl chloride and an aminoplast resin is disclosed. The interpolymers raise the softening point of thermoplastic copolymers of alkyl vinyl ethers with vinyl chloride and act to improve their hardness. The interpolymers also form hard, nonblocking, flexible and glossy films suitable for coating metal surfaces. Included are compositions based on these interpolymers which are useful for hard-coating metal surfaces and procedures for coating metal surfaces with such interpolymer compositions.

FIELD OF THE INVENTION

This application relates to interpolymers of vinyl chloride with alkyl vinyl ethers and nitrogen-containing resins and more particularly to such interpolymers where the nitrogen-containing resins are aminoplasts formed by the reaction of reactive organic compounds having more than one —$NH_2$ group per molecule with aldehydes.

Copolymers of alkyl vinyl ethers with vinyl chloride are well known in the polymer art. Such copolymers have been reported by C. C. Schildknecht in his book "Vinyl and Related Polymers" published by John Wiley & Sons, Inc., New York (1952) and in PB report 485, A. G. Kern (1945). Much is devoted in these publications to the permanently thermoplastic copolymer of isobutyl vinyl ether and vinyl chloride. It has a softening point (ring and ball) of about 140° C. and a pencil hardness of B to H.

In the metal decorating field, products often require finishes which are able to withstand scratching and mechanical abuse. Such finishes are often applied to metal furniture and appliances. Because of their rather low hardness, the above-mentioned copolymers have less than optimum qualities for such uses.

Further, coated metal pieces are often stacked at the factory for shipment and often such stacked metal objects are exposed to relatively elevated ambient temperatures by shipment to geographical areas where such elevated ambient temperatures occur. It has been noted that coated products coated with materials having relatively low-softening points such as the alkyl vinyl ether/vinyl chloride copolymers mentioned above, tend to "block" or stick together.

It is an object of this invention to provide novel film-forming interpolymers with improved physical properties of the films including flexibility, hardness and absence of blocking tendencies at temperatures encountered in normal commerce.

It is a further object of this invention to provide compositions containing such interpolymers which are useful in the coating of objects with such improved interpolymers.

It is a further object of this invention to provide methods for the preparation of the interpolymers and the coating of metal parts with the aforesaid compositions containing such interpolymers.

In the past, several attempts have been made to achieve the aforesaid objects by the addition to the copolymer of alkyl vinyl ethers with vinyl chloride of hard thermosetting resins. Unfortunately, very few of the many available thermosetting resins are compatible with these copolymers.

We have found that the general class of aminoplasts are compatible with the alkyl vinyl ether/vinyl chloride copolymers. This compatibility extends over a wide range of concentrations. Mixtures of such compatible aminoplast thermosetting resins with these copolymers may be catalyzed to form hard interpolymers having relatively high-softening points as compared to the softening points of the copolymers. Such interpolymers of the aminoplasts with the copolymers are set up over easily achieved curing schedules to form hard, non-blocking, flexible, glossy films suitable for application to various substrates particularly metal objects.

The interpolymer of this invention is a combination of an alkyl vinyl ether/vinyl chloride copolymer and an aminoplast wherein said aminoplast is the reaction product of aldehydes with organic compounds having more than one reactive —$NH_2$ group per molecule.

The copolymer components of the present invention are characterized by the general formula:

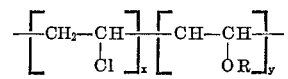

wherein R is alkyl or hydroxy-functioning alkyl of 1 to 8 carbon atoms. X may be varied from 50 to 99% by weight of said copolymer and y may be varied from 1 to 50% by weight of said copolymer.

Among the vinyl alkyl ethers suitable for the formation of the copolymer component of the present invention, there may be mentioned:

methyl vinyl ether
ethyl vinyl ether
n-propyl vinyl ether
isopropyl vinyl ether
n-butyl vinyl ether
isobutyl vinyl ether
t-butyl vinyl ether
n-amyl vinyl ether
isoamyl vinyl ether
t-amyl vinyl ether
n-hexyl vinyl ether
n-heptyl vinyl ether
n-octyl vinyl ether
isooctyl vinyl ether
2-ethylhexyl vinyl ether.

Thus, the copolymer of the poly (alkyl vinyl ether) with vinyl chloride to form the copolymer component may be in the form of a random or locked copolymer or as mixtures of the homopolymers or copolymers of the vinyl chloride with the poly (alkyl vinyl ether).

Suitable mixtures which can form in copolymer units within the vinyl chloride/poly (alkyl vinyl ether) copolymer are prepared from mixtures of the various monomers set forth above such as mixtures of methyl vinyl ether with 2-ethylhexyl vinyl ether and also of ethyl vinyl ether with isobutyl vinyl ether. The preferred vinyl ethers for the copolymer component with vinyl chloride are isobutyl vinyl ether and 2-ethylhexyl vinyl ether. A useful mixture containing about 30 weight percent of isobutyl vinyl ether and about 70 weight percent of vinyl chloride is commercially available and is among the preferred alkyl vinyl ether copolymer components of this invention.

In place of the alkyl vinyl ether there may also be used the hydroxy-group containing vinyl monomers such as the ω-hydroxy alkyl vinyl ethers of 1 to 8 carbon atoms.

The following compounds are illustrative of hydroxyl group-containing monomers;

hydroxy ethyl vinyl ether
2-hydroxy-n-propyl vinyl ether
4-hydroxybutyl vinyl ether
3-hydroxypropyl vinyl ether
6-hydroxyhexyl vinyl ether
and the like.

It should be noted that the preferred hydroxy-group containing vinyl monomers are those with a ω-hydroxyalkyl vinyl ether prepared by the reaction of acetylene with ω-dihydroxy alkanes (α,ω-alkalene glycols).

While vinyl chloride is the other primary component of the backbone polymer, it may be replaced by vinyl bromide or iodide if necessary or desirable.

The nitrogen-containing components of the interpolymers of this invention may generally be considered as those condensation polymers of aldehydes with organic compounds which contain more than one —$NH_2$ group per molecule. These are referred to as amino resins or aminoplasts by G. Odenian in his book "Principles of Polymerization" published by McGraw-Hill, New York, N.Y. (1970) and in Modern Plastics Encyclopedia (October 1959 ed.) Among the commercially useful aldehydes for such condensation reaction by formaldehyde and glyoxal. Among the amine-containing compounds for reaction with the aldehydes to form aminoplasts are urea, melamine, triazine, benzoguanamine, ethyleneurea, dicyanidamide, thiourea, aniline, and α-methyl, α-actopimeloguanamine and mixtures thereof. The aminoplasts may be prepared by the condensation reaction of the aldehydes with one or more of the amine-group containing components. Preferred for the purposes of this invention are the methylamine formaldehyde, urea formaldehyde and triazine formaldehyde aminoplasts. In general, they should be present in proportion to the total interpolymer, from approximately one to approximately 20 percent by weight of the total interpolymer.

The interpolymers of this invention are preferably prepared in situ upon the objects on which they are to be applied from mixtures of the dissolved components.

The copolymer of the alkyl vinyl ether with vinyl chloride and the nitrogen-containing component having more than one —$NH_2$ group are dissolved or suspended in a suitable solvent or medium and this composition is preferably applied to the article to be coated. The coated article is then heated until there is an interpolymerization between the copolymer and the aminoplast to form the interpolymer. It is postulated that a certain amount of crosslinking is caused by the aminoplast between adjacent long-chains of the copolymer of the alkyl vinyl ether with vinyl chloride.

Suitable solvent compositions for the components can be formulated from aromatic hydrocarbons, aliphatic hydrocarbons, alcohols, ketones, esters and preferably from mixtures thereof. Solvents for vinyl chloride/alkyl vinyl ether copolymers (A) include xylene, benzene, toluene, N-methyl-2-pyrrolidone, butyrolactone, methyl isobutyl ketone, acetone, methyl ethyl ketone, ethyl acetate, Cellosolve (ethylene glycol mono ethyl ether), Solvesso 100 (ligroin), Cellosolve acetate (2-ethoxyethoxyethoyl-acetate) and the like. Preferred solvents for the alkyl vinyl ether/vinyl chloride polymer and its components are the aliphatic or aromatic hydrocarbons and ketones and esters such as acetone and ethyl acetate and mixtures thereof. Aminoplastic resins (B) are soluble in toluene, xylene, acetone and miscible with ethanol, butanol, high alcohols such as capyryl alcohol and octyl alcohol, Cellosolve, Cellosolve acetate, ethyl acetate, butyl acetate and methyl ethyl ketone. The aminoplasts are readily soluble in ketones and esters and in mixtures of these. Mixtures of (A) and (B) would be expected to be soluble in common solvents in these lists.

Among the suitable catalysts to promote the interpolymer of the compositions of this invention useful for the application to metal surfaces of the resins of this invention, are the monomer di- and tri-halo acetic acids or similarly halogenated short-chain aliphatic acids or aryl sulfonic acids including the commonly used benzene sulfonic acid and the p-toluene sulfonic acids. Such catalysts are not absolutely necessary. It is possible to achieve the interpolymerization merely by extending the time for the reaction to run to completion after reaction initiation temperatures are reached.

Useful stabilizers for use with the compositions of this invention include the organotins, organo-bariums and organo-cadmiums and epoxidized long-chain compounds. Among the organotins, there may be mentioned the dialkyltins such as dibutyl and dioctyltin. The organotin, organo-barium and organo-cadmium compounds are preferably in the form of barium and cadmium salts of alkanoic acids such as are commonly used for the stabilization of vinyl chloride. The preferred epoxidized compound is soybean oil.

After the coating composition has been applied, the coated objects are heated in order that the interpolymer be formed. The heating operation can be in any conventional manner. Conventional heating means including batch ovens, heating tunnels and trays may be utilized. Agitation of the objects coated with the pre-interpolymerization composition during the initial heating phases is useful to prevent bald spots. The types of heat that are useful include heated air, radiant heat, radio frequency or medium frequency induction heatings. The latter is particularly useful as at certain frequencies above about 15 kHz.

The entire metal object is not heated. Due to the "skin" effect, in metals at high frequencies, only the surface of the metal is heated. In any event, the heating or baking cycle should preferably range up to ten minutes and at temperatures ranging between 300° F. and 600° F. The heating cycle may be evenly applied or an initial low-temperature solvent-removal phase may be followed by a curing phase at polymerization initiating temperatures (300° F.). Of course, at the higher temperatures, the heating times may be decreased.

It will be appreciated by one skilled in the art, that the conditions referred to may be varied from a particular suggested optimum as the success of the process does not depend upon the maintenance of the condition with such exactitude and the alteration of a particular condition may be compensated for by the alteration of another concurrently operating condition.

The invention will be demonstrated in the following examples wheerin all parts noted are by weight. Where specific components are denoted, it is to be realized that functional equivalents thereof can be substituted.

EXAMPLE 1

The following mixtures were prepared:

|  | 1 | 2 | 3 | 4 | 5 |
|---|---|---|---|---|---|
| Solution A (see description below), g | 50 | 50 | 50 | 50 | 50 |
| Solution B (see description below), g | 0 | 0.83 | 1.66 | 3.32 | 4.98 |
| Catalyst, g. (p-toluene sulfonic acid) | 0 | 0.10 | 0.15 | 0.20 | 0.35 |
| Stabilizer, g. (soybean oil) | 0.1 | 0.1 | 0.1 | 0.1 | 0.1 |
| Parts of nitrogen-containing resin-solids per hundred parts of vinyl chloride copolymer | 0 | 5 | 10 | 20 | 30 |

Solution A is composed by 20% of a copolymer of isobutyl vinyl ether and vinyl chloride in a 25:75 ratio and 80% of xylene.

Solution B is composed by 60% of a copolymer of urea and formaldehyde having the following elemental composition: C: 50.12%; H: 8.75%; N: 16.54%; O: 24.59%, said copolymer having an acid number of 3 to 8, and 40% of a mixture of xylene and butanol in a ratio of 1:1.5; said solution having a specific gravity of 1.02, a viscosity (Gardner-Holdt) of L–O, and a mineral thinner dilution tolerance of at least 1 part of solution to 5 parts of diluent.

Films 1.2 mils thick of all five solutions were cast on tinfoil, baked for 3 minutes at 400° F. and tested for hardness and blocking. The results obtained were:

| Solution Number | 1 | 2 | 3 | 4 | 5 |
|---|---|---|---|---|---|
| Blocking (1 hr. at 200° F., 2 p.s.i.) | Considerable | Slight | Very slight | None | None |
| Pencil hardness | F | H | 2H | 4H | 7H |

EXAMPLE 2

The following mixtures were made:

|  | 1 | 2 | 3 |
|---|---|---|---|
| Solution A, g | 50 | 50 | 50 |
| Solution C, g |  | 2.32 | 4.98 |
| Catalyst |  | 0.20 | 0.35 |
| Parts of nitrogen-containing resin-solids per hundred parts of vinyl chloride copolymer | 0 | 20 | 3 |

Solution A is the same as in Example 1.

Solution C is composed by 60% of a copolymer of melamine and formaldehyde and 40% of a solvent based on xylene and butanol in a 1:1 ratio, said copolymer having an acid number of 0 to 2, and said solution having a specific gravity of 1.01, a viscosity (Gardner-Holdt) of 1–L, and a mineral thinner dilution tolerance of at least 1 part of solution to 5 parts of diluent.

The catalyst is the same as in Example 1.

Films 1.2 mils thick of all three solutions were cast on tinfoil, baked for 5 minutes at 400° F., with the following results:

| Solution Number | 1 | 2 | 3 |
|---|---|---|---|
| Blocking | Considerable | None | None |
| Pencil hardness | F | 4H | 4H |

EXAMPLE 3

Example 2 was repeated, but instead of using solution C, solution D was used, which is composed by 60% of a copolymer of triazine and formaldehyde having the following elemental composition: C: 62.91%; H: 7.72%; N: 22.94% and O: 8.15%, and 40% of a solvent based on xylene and butanol in a 1:1 ratio, said copolymer having an acid number from 0 to 1, said solution having a specific gravity of 1.04, a viscosity (Gardner-Holdt) of G to K, and a mineral thinner tolerance of at least 1 part solution to 5 parts of mineral thinner.

Results similar to Example 2 were obtained.

EXAMPLE 4

An experiment similar to Example 1 was made, except that 10% of titanium dioxide pigment was ground into each solution. Results were similar to those of Example 1.

EXAMPLE 5

An experiment similiar to Example 1 was made, except that the copolymer employed to make solution A was a copolymer of 2-ethyl hexyl vinyl ether and vinyl chloride in a 20:80 ratio. Results were similar to those of Example 1.

EXAMPLE 6

An experiment similar to Example 1 was made, except that the copolymer used to make solution B was an ethyleneurea formaldehyde resin. Results were similar to those of Example 1.

What is claimed is:

1. An interpolymer comprising approximately by weight a pre-formed copolymer of about 25% to about 50% alkyl vinyl ether and about 50 to 80% vinyl chloride copolymerized with about 1 to 20% based on the weight of said copolymer of an aminoplast condensate formed by the condensation reaction of an aldehyde with an organic compound having more than one reactive —NH$_2$ group in the molecule, in the presence of an acid heat-activatable catalyst selected from the group consisting of the monomer di- and tri-halo acetic acids, halogenated short chain aliphatic acids and aryl sulfonic acids, at a temperature of at least about 400 to 600° F. for about 1 to 10 minutes.

2. The interpolymer according to claim 1 wherein the alkyl component of the alkyl vinyl ether has a carbon chain length of 1 to 8 carbon atoms.

3. The interpolymer according to claim 1 wherein the aminoplast condensate is a condensation resin of an aldehyde with any one of urea, melamine, triazine, benzoguanoamine, ethylene urea, dicyandiamide, thiourea, and α-methyl-2-acetopimeloguanamine or mixtures thereof.

4. The interpolymer according to claim 2 wherein the alkyl vinyl ether is isobutyl vinyl ether.

5. The interpolymer according to claim 2 wherein the alkyl vinyl ether is ethylhexyl vinyl ether.

6. The interpolymer according to claim 3 wherein the aminoplast is a urea-formaldehyde resin.

7. The interpolymer according to claim 3 wherein the aminoplast is a melamine-formaldehyde resin.

8. The interpolymer accoridng to claim 3 wherein the aminoplast is a 2,4,6-triamino-s-triazine-formaldehyde resin.

References Cited
UNITED STATES PATENTS

| 2,581,908 | 11/1952 | Kinzinger | 260—853 |
| 2,767,154 | 10/1956 | Weihe | 260—853 |
| 3,211,806 | 10/1965 | Petropoulos et al. | 260—853 |
| 3,211,676 | 10/1965 | Spencer | 260—853 |
| 3,112,287 | 11/1963 | Bach et al. | 260—853 |
| 2,982,670 | 5/1961 | Jeff | 260—853 |

JOHN C. BLEUTGE, Primary Examiner

U.S. Cl. X.R.

117—132 BF, 161 LN; 260—31.2 N, 32.8 N, 33.4 R, 33.6 R, 45.75 R